(No Model.) 2 Sheets—Sheet 1.

J. PETERSON.
PLOW.

No. 335,620. Patented Feb. 9, 1886.

Witnesses.
John C. Perkins
Ralph Littler

Inventor.
John Peterson
By Lucius C. West
Atty.

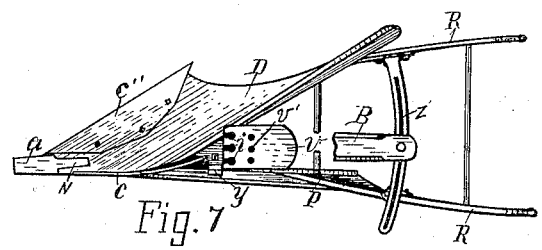
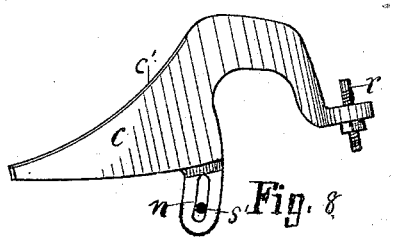
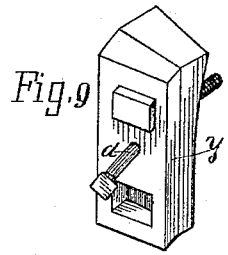
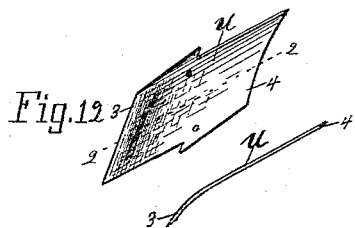
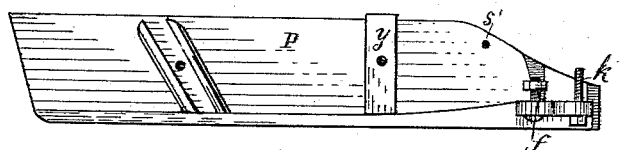

UNITED STATES PATENT OFFICE.

JOHN PETERSON, OF WATSON, MICHIGAN.

PLOW.

SPECIFICATION forming part of Letters Patent No. 335,620, dated February 9, 1886.

Application filed June 2, 1885. Serial No. 167,373. (No model.)

*To all whom it may concern:*

Be it known that I, JOHN PETERSON, a citizen of the United States, residing at Watson, (Kellogg P. O.,) county of Allegan, State of Michigan, have invented a new and useful Plow, of which the following is a specification.

This invention has for its object certain improvements, hereinafter described and claimed, designed to increase the utility of this class of implements.

Figure 1:
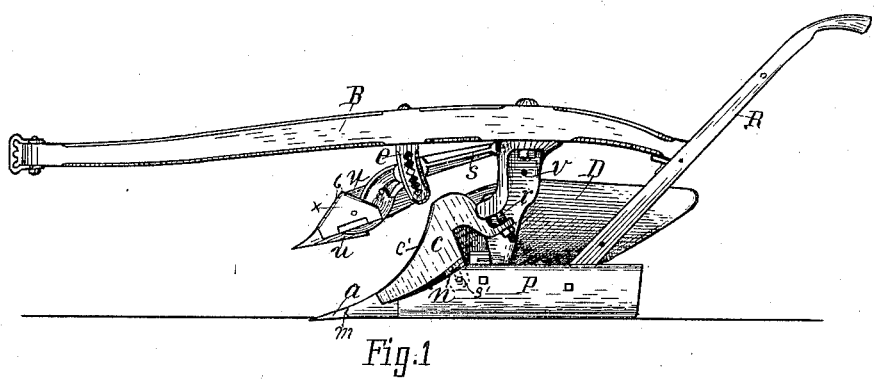
Figure 2:
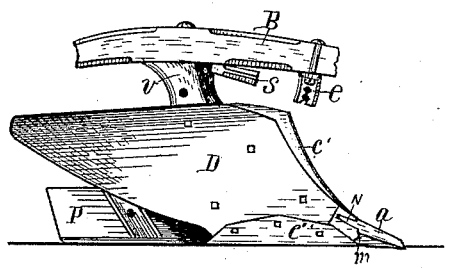
Figure 4:
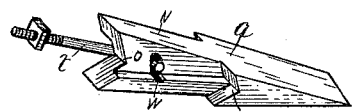
Figure 3:
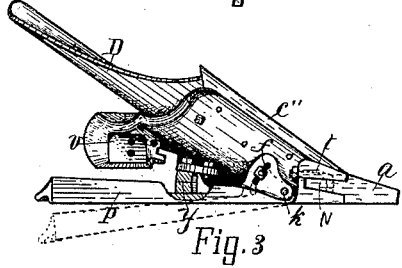
Figure 5:
Figure 6:
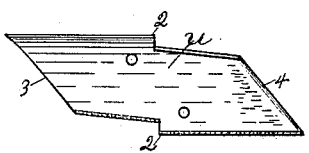

In the drawings forming a part of this specification, Figure 1 is a side elevation, looking against the landside of the plow. Fig. 2 is an elevation, looking against the mold-board, parts being broken away. Fig. 3 is a bottom view; Fig. 4, a perspective view of the plow-point enlarged; Fig. 5, an enlarged view of a detail in Figs. 1 and 7, pointed out by like letters; Fig. 6, a plan of a detail in Fig. 1, enlarged. Fig. 7, a top view; Fig. 8, an enlarged view of a detail in Figs. 1, 2, and 7; Fig. 9, an enlarged perspective of parts in Figs. 3 and 7. Fig. 10 is a top view of Fig. 8; Fig. 11, an inside view of the landside of the plow enlarged; and Fig. 12 shows a perspective view of Fig. 6, and a section on line 2 2 in said Fig. 12.

The several details of the main figures above enumerated are pointed out by like letters, and are fully described below.

Referring to the letters marked on the drawings, B is the plow-beam, bolted to the top of the support $v$, in one of the series of holes $v'$, according to the desired angle of the beam, Figs. 1, 2, 3, 7. The rear end of the beam B rests on a slotted bar, $z$, said bar being secured to the handles R, Fig. 7. A bolt passes through the rear end of the beam B and through the slot in bar $z$, by which means this end of said beam is adjusted and secured in any lateral position desired in changing and fixing the line of draft.

A jointer is shown in Fig. 1.

S is the jointer-beam, provided with a jointer in the form of a small plow. The landside consists, back of the point, in a plate, $x$, having two inclined cutting-edges, 6. This plate is reversible, so as to use either of these cutting-edges at a time desired. The mold-board U of the jointer, Fig. 6, is also reversible, the strain coming on the shoulders 2 2, the whole fitting a recess on the mold-board side adapted to receive it. One end, 3, Fig. 12, is turned outward, and when used with said end to the rearward, the furrow made by the jointer is turned farther over. This is the case when plowing old ground grown to weeds; but when cutting sod the end 4 is presented to the rear. When the end 3 is forward, it being curved or thrown outward, it projects farther from the jointer. The plate $x$ for this reason is longer on one side of its securing-bolt than the other, and when the end 3 of plate U is used forward the long end of plate $x$ is used forward, thus presenting a thin cutting-edge to the jointer and extended forward for cutting sod.

In Fig. 12 the form of the mold-board U is more fully shown by the section on line 2 2, in said figure. The rear end of the beam S is formed to fit the peculiar shape of the slots $i$, Fig. 7. These slots are in the front side of the top of the support $v$, and are open in front, with rounded enlargements at the rear portion. Thus the end of the jointer-beam S forms a socket-joint in one of these series of slots $i$ in the beam-support $v$, by which means the beam S is held therein and is adapted to be swung laterally in adjusting it to the desired position in relation to the line of draft. The beam S is held in said lateral position by the slotted support $e$. This support is bolted beneath the beam B, and is laterally adjustable. The jointer-beam S may be placed on either side of the vertical part of the support $e$, thus securing a greater change in position laterally. The beam S is vertically held and adjusted in the support $e$ in the usual manner.

In Figs. 1 and 8 an adjustable colter, $c$, is shown, which also forms a part of the wearing portion of the plow on the landside. Its front edge, $c'$, conforms to the usual curve of the plow above the point $a$. The colter $c$ is adjustably held in different positions connected with the plow by a bolt, $r$, passing through a rear extension of the colter, and through a lateral extension of the beam-support $v$, Fig. 1, and by the slotted lug $n$ on the lower side, which connects with the inside of the landside P by a bolt at S'. The curved edge $c'$ is sharpened to cut sod. When plowing sod, this edge is thrown farther beyond the front edge of the plow than when plowing other ground. The landside P of the plow is laterally adjustable at the rear end, Fig. 3, to govern the width of furrow turned by the plow. It is provided with an inwardly-extending lug at the front end, which lug is provided with a slot, in which a bolt, *f*, passes, and with a hole in which the bolt *k* pivots the landside to the base of the support *v*. By loosening the nut of bolt *f* the landside is moved outward or inward, and is secured at the desired point by tightening the nut again. The landside P is held still more secure, and yet in an adjustable manner, by the bolt *d*, Fig. 9, passing through the beveled blocks *y*, Figs. 3 and 9. The bolt is curved, and one edge of the blocks is thinner than the other, to make them conform to the curve. The number of these blocks is increased and decreased according to the fixed position at the time of the adjustable landside P. The lower side of the mold-board D, Figs. 2, 7, is recessed to receive a detachable and reversible base, *c″*. This base, Fig. 5, is in the form of an end elevation of a curb-roof, and fits in place either side out, so that when one side is unduly worn it can be reversed side for side and end for end. The point of the plow *a*, Fig. 4, is formed with the tenon portion N, having V-shaped shoulders at *o* in the end, and at *m* on both opposite sides, and so formed that it will fit a recess in the nose of the plow made to detachably receive it either side up, so that it can be reversed when the lower side of the point wears off. (See Figs. 1, 2, and 7, illustrating the point adjusted in its recess.) The whole strain on the point comes on the part N and the shoulders *o m m*, the hooked bolt *t* being used to hold the point in the recess by catching in the slot *w* of the point.

It will be observed that the adjustable parts of my plow fit it for a multiple of uses, and that the reversible parts obviate the necessity of procuring new findings so often; hence great economy is effected in its use.

Having thus described my invention, what I claim as new, and desire to secure by Letters Patent, is—

1. The combination of the plow-beam support having the open series of recesses, with the rounded rear enlargement in the front side of the upper end of said support, and the jointer-beam provided with a share, the rear end of said beam being adapted to enter said recess and form a detachable socket-joint, and a support to the jointer-beam adjustably connecting it with the plow-beam, substantially as set forth.

2. The plow provided with the adjustable colter forming part of the landside, and having slotted lugs at its lower and rear side for adjustably connecting it with the plow-standard and mold-board base, substantially as set forth.

3. The combination of the plow-point having the tenoned securing end, V-shoulders each side where the tenon joins the point, and a like shoulder at the free end of the tenon, the latter transversely slotted, a plow having a nose-recess adapted to receive and conform to the shape of the tenon and shoulders of the point, and a securing-bolt having a hooked end to lock in the tenon-slot, whereby the point may be shifted either side up and held secure in either position, substantially as set forth.

4. The plow provided with the landside pivoted at its forward end, and provided with the curved slot in which the vertical bolt is passed, and the curved securing-bolt and beveled blocks, all arranged substantially as set forth.

5. A plow-jointer provided on its mold-board side with a mold-board reversible end for end, one end thereof being curved or thrown outward, for the purpose stated, and provided on its landside with the reversible colter-plate having the slanting cutting-edges, the distance from the securing-bolt of said plate to said cutting-edges being greater on one side than the other, substantially as set forth.

In testimony of the foregoing I have hereunto subscribed my name in presence of two witnesses.

JOHN PETERSON.

Witnesses:
RALPH LITTLER,
JOHN H. CHASE.